(12) United States Patent
Bae et al.

(10) Patent No.: US 8,717,147 B2
(45) Date of Patent: May 6, 2014

(54) PASSIVE RFID SYSTEM AND METHOD

(75) Inventors: Ji Hoon Bae, Daejeon (KR); Cheng Hao Quan, Daejeon (KR); Dong Han Lee, Daejeon (KR); Chan Won Park, Daejeon (KR); Won Kyu Choi, Daejeon (KR); Kwang Soo Cho, Daejeon (KR); Man Sik Park, Daejeon (KR); Gil Young Choi, Daejeon (KR); Jong Suk Chae, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 718 days.

(21) Appl. No.: 12/886,689

(22) Filed: Sep. 21, 2010

(65) Prior Publication Data

US 2011/0148585 A1    Jun. 23, 2011

(30) Foreign Application Priority Data

Dec. 18, 2009  (KR) .................. 10-2009-0127533
Mar. 25, 2010  (KR) .................. 10-2010-0026894

(51) Int. Cl.
*H04Q 5/22*   (2006.01)

(52) U.S. Cl.
USPC ......... 340/10.3; 340/10.1; 370/431; 370/458; 375/270; 375/277; 375/301

(58) Field of Classification Search
USPC .......... 340/10.1–10.6, 572.2, 572.4; 370/431, 370/458–462; 375/270, 277, 296–298, 301
See application file for complete search history.

(56) References Cited

U.S. PATENT DOCUMENTS

| 5,649,296 A | 7/1997 | MacLellan et al. |
| 7,212,578 B2* | 5/2007 | Lee et al. ...................... 375/267 |
| 2005/0136861 A1* | 6/2005 | Sorrells et al. ................ 455/118 |
| 2008/0122581 A1 | 5/2008 | Bae et al. |
| 2008/0272891 A1* | 11/2008 | Amtmann .................... 340/10.1 |
| 2009/0045923 A1 | 2/2009 | Van Eeden |

FOREIGN PATENT DOCUMENTS

| KR | 2007-0020869 | 2/2007 |
| KR | 2007-0109842 | 11/2007 |
| KR | 2009-0065641 | 6/2009 |
| WO | 99/34526 | 7/1999 |

* cited by examiner

*Primary Examiner* — Brian Zimmerman
*Assistant Examiner* — Laura Nguyen
(74) *Attorney, Agent, or Firm* — Staas & Halsey LLP

(57) ABSTRACT

Disclosed are a passive RFID (Radio Frequency Identification) system and method capable of recognizing a great deal of tags at a high speed. A reader of a passive RFID system, including: a processor dividing slots and subchannels to configure a round, recognizing subchannels that are not involved in a collision and interference by the slots, and changing the subchannels that are not involved in a collision and interference, into a sleep state; a transmission unit encoding a command generated through the processor, performing an amplitude jitter modulation on the encoded command, and transmitting the modulated command; and a reception unit acquiring and demodulating tag signals received through a plurality of subchannels by the slots, and providing the demodulated tag signals to the processor.

15 Claims, 12 Drawing Sheets

PASSIVE RFID SYSTEM AND METHOD

CROSS-REFERENCE TO RELATED APPLICATIONS

This application claims the priorities of Korean Patent Application Nos. 10-2009-0127533 filed on Dec. 18, 2009 and 10-2010-0026894 filed on Mar. 25, 2010, in the Korean Intellectual Property Office, the disclosures of which are incorporated herein by reference.

BACKGROUND OF THE INVENTION

1. Field of the Invention

The present invention relates to a passive RFID (Radio Frequency Identification) system and, more particularly, to a passive RFID system and method capable of recognizing a great deal of tags at a high speed by using a slot-based multi-subchannel access scheme.

2. Description of the Related Art

In general, an RFID is a technique of reading or writing information in a non-contact manner from a tag having unique identification information by using a radio frequency, in order to recognize, track and manage a tagged article, an animal, a person, and so on.

An RFID system includes a plurality of tags (e.g., electronic tags or transponders) having unique identification information and attached to articles, animals, and so on, and an RFID reader (or interrogator) for reading or writing tag information.

The RFID system is divided into a mutual induction type RFID system and an electronic wave type RFID system depending on a mutual communication scheme between a reader and a tag, divided into an active RFID system and a passive RFID system depending on whether or not a tag is operated by power of the system itself, and divided into a long-wave RFID system, a medium-wave RFID system, a short-wave RFID system, an ultrashort-wave RFID system, and a ultrahigh frequency RFID system depending on the utilized frequency.

In particular, an RFID application fields are gradually extending from the current pellet and box-unit recognition to an individual unit article recognition, and an RFID of the individual unit article application requires techniques for recognizing a great deal of articles at a high speed.

The existing class 1 Gen2 standard of the UHF band retains a technique of simultaneously recognizing a great deal of tags by using a Q random collision prevention algorithm; however, because a plurality of queries and response packets are configured as a round in which communication is performed between a reader and a tag, as the number of tags within a reader recognition range, time required for the reader to recognize the entire tags is sharply lengthened.

To overcome this problem, the TOTAL (Tag Only Talks After Listening) scheme of the "wireless communication system" of US 20090045923 employs an ALOHA algorithm in which a tag first queries and then, when the tag receives energy from a reader, the tag immediately transmits its ID to the reader, unlike the existing RFID standard. This technique is advantageous for fast and instantaneous recognition between the reader and the tag.

However, as there is no query command for the reader to control the tag, this technique is only suitable for the recognition of a few tags. That is, in the ALOHA algorithm according to which each tag randomly selects a packet transmission start time to transfer data, if the number of tags increases, inter-tag packet collision increases, so the reader fails to recognize a greater deal of tags.

Meanwhile, an international standardization of an ISO 18000-3 mode 3 (HF Gen2) protocol is ongoing in order to apply the UHF band high performance Gen2 protocol standard to an HF band favorable to a metal and liquid environment.

The ISO 18000-3 mode 3 protocol standard includes a mandatory 18000-6C UHF Gen2 protocol-based transmission scheme and an optional 18000-3 mode 2-based air interface. The 18000-3 mode 2 protocol standard of HF band RFID minimizes a transmission interference between a reader and a tag by using a phase jitter modulation (PJM) scheme and adopts a frequency multi-division scheme for simultaneously receiving a plurality of tags by using multiple channels, thus exhibiting good performance compared with the existing HF band protocol like 14443 A/B or 15693. Also, the standardization of the 18000-3 mode 3 protocol standard is ongoing, so as to adopt the PJM scheme of the characteristics of the 18000-3 mode 2 as an option by interworking with the Gen2 protocol.

SUMMARY OF THE INVENTION

An aspect of the present invention provides a passive RFID system and method capable of recognizing a great deal of tags at a high speed by reducing inter-tag collisions and interference by using a slot-based multi-subchannel access scheme.

Another aspect of the present invention provides a passive RFID system and a method capable of allowing a tag recognized by a reader to operate in a sleep state to thus prevent tags from colliding or interfering with each other unnecessarily, due to a signal from the recognition-completed tag.

According to an aspect of the present invention, there is provided a reader of a passive RFID system, including: a processor dividing slots and subchannels to configure a round, recognizing subchannels that are not involved in a collision and interference by the slots, and changing the subchannels that are not involved in a collision and interference, into a sleep state; a transmission unit encoding a command generated through the processor, performing an amplitude jitter modulation on the encoded command, and transmitting the modulated command; and a reception unit acquiring and demodulating tag signals received through a plurality of sub-channels by the slots, and providing the demodulated tag signals to the processor.

The transmission unit may include: a message generation unit generating a message having a command generated through the processor; an encoding unit encoding the message generated by the message generation unit to generate I and Q channel signals; and an amplitude jitter modulation unit performing an amplitude jitter modulation on the I and Q channel signals and outputting the modulated signals to an antenna.

The amplitude jitter modulation unit may include: a phase delay phase-delaying a carrier signal by 90 degrees and outputting the same; first and second transmission mixers mixing the I channel signal in the carrier signal and the Q channel signal in the output signal from the phase delay; first and second attenuators attenuating the amplitude of the output signals of the first and second transmission mixers; first and second adders adding an output signal from the phase delay to an output signal from the first adder and the carrier signal to an output signal from the second attenuator; and a third adder adding the output signals of the first and second adders.

The amplitude jitter modulation unit may receive a slot command requesting the providing of a tag signal from a tag that currently uses a slot and a sleep command changing a subchannel that is not involved in a collision and interference into a sleep state, among commands generated through the processor, as the I and Q channel signals, simultaneously modulate them in amplitude, and output the same.

The reception unit may include: a carrier demodulation unit removing the carrier signal included in the tag signal; a multi-subcarrier demodulation unit extracting a tag signal of each subchannel from an output signal from the carrier modulation unit; a preamble extracting unit extracting a preamble of a valid tag signal from an output signal from the multi-subcarrier demodulation unit; and a decoding unit decoding an output signal from the preamble extracting unit and transferring the decoded signal to the processor.

According to another aspect of the present invention, there is provided a tag of a passive RFID system, including: a slot selection unit randomly selecting a slot to be used for communicating with a reader; a subchannel selection unit randomly selecting a subchannel to be used for communicating with the reader; an amplitude jitter demodulation unit performing an amplitude jitter demodulation on a signal transmitted from the reader; a tag controller selecting a single slot or subchannel through the slot selection unit and the subchannel selection unit according to the signal demodulated through the amplitude jitter demodulation unit, and determining whether to transmit a tag signal to the reader or whether to enter a sleep state; and a tag signal generation unit transmitting the tag signal to a subchannel selected by the slot selection unit.

The amplitude jitter demodulation unit may include: first and second phase delays delaying the phase of the signal transmitted from the reader by 90 degrees and 180 degrees; first and second reception mixers mixing output signals from the first and second phase delays and a signal transmitted from the reader; and first and second low pass filters (LPFs) filtering output signals from the first and second reception mixers to extract I and Q channel signals.

According to another aspect of the present invention, there is provided an operation method of a reader included in a multi-subchannel passive RFID system of a slot-based time division scheme, including: transmitting a query command when a round starts or is updated to inform a plurality of tags about the number of slots and subchannels constituting the current round; simultaneously transmitting a slot command and a sleep command by the slots to request a tag signal and, at the same time, entering a tag using a subchannel that does not cause a collision and interference in a previous slot into a sleep state; and acquiring and analyzing a transmitted tag signal in response to a query command or a slot command by the slots to recognize a subchannel that is not involved in a collision and interference in a current slot, and re-entering the control operation.

The slot command and the sleep command may be transmitted in the form of I and Q channel signals which have been amplitude jitter modulated.

The query command may include a command field in which information indicating that a corresponding command is the query command, a group selection field in which information regarding a tag group is stored, a Q field in which information regarding the number of slots is stored, and an R field in which information regarding the number of subchannels is stored.

The sleep command may include: a command field in which information indicating that a corresponding command is the sleep command is stored, a slot field in which information regarding whether all the tags which have responded to previous slots are to enter a sleep state or whether only a tag using a subchannel that is not involved in a collision and interference in a previous slot is to enter a sleep state is stored, and a channel sleep field in which information regarding a subchannel that is not involved in a collision and interference is stored.

According to another aspect of the present invention, there is provided a operation method of a tag, including: when a query command is received, analyzing the query command to recognize the number of slots and subchannels constituting a current round, and selecting one slot and one subchannel to be used for communicating with a reader; and simultaneously receiving a slot command and a sleep command and determining whether to transmit a tag signal to the reader in response to the slot command or whether to enter a sleep state in response to the sleep command.

The query command may include a command field in which information indicating that a corresponding command is the query command is stored, a group selection field in which information regarding a tag group is stored, a Q field in which information regarding the number of slots is stored, and an R field in which information regarding the number of subchannels is stored.

The selecting of the single slot or subchannel may include: interpreting the group selection field of the sleep command to determine whether to participate in the current round; and when it is determined to participate in the current round, interpreting the Q field and the R field to recognize the number of slots and subchannels constituting the current round, and selecting one slot and one subchannel to be used for communicating with the reader.

The slot command and the sleep command may be transmitted in the form of I and Q channel signals which have been amplitude jitter modulated.

The sleep command may include: a command field in which information indicating that a corresponding command is the sleep command is stored, a slot field in which information regarding whether to enter a sleep state by the slots or by the channels is stored, and a channel sleep field in which information regarding a subchannel that is not involved in a collision and interference is stored.

The determining as to whether to enter the sleep state may include: interpreting the slot field of the sleep command to recognize whether to enter the sleep state by the slots or by the channels; when it is determined to enter the sleep state by the slots, unconditionally entering the sleep state; and when it is determined to enter the sleep state by the channels, additionally interpreting the channel sleep field to recognize subchannels to enter the sleep state and determine whether to enter the sleep state.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

As the present invention allows for various changes and numerous embodiments, particular embodiments will be illustrated in drawings and described in detail in the written description.

However, this is not intended to limit the present invention to particular modes of practice, and it is to be appreciated that all changes, equivalents, and substitutes that do not depart from the spirit and technical scope of the present invention are encompassed in the present invention.

While such terms as "first" and "second," etc., may be used to describe various components, such components must not be limited to the above terms. The above terms are used only to distinguish one component from another. For example, a first component may be referred to as a second component without departing from the scope of the rights of the present invention, and likewise, a second component may be referred to as a first component.

When a component is mentioned to be "connected" to or "accessing" another component, this may mean that it is directly connected to or accessing the other component, but it is to be understood that another component may exist in-between. On the other hand, when a component is mentioned to be "directly connected" to or "directly accessing" another component, it is to be understood that there are no other components in-between.

The terms used in the present application are merely used to describe particular embodiments, and are not intended to limit the present invention. An expression used in the singular encompasses the expression of the plural, unless it has a clearly different meaning in the context. In the present application, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Unless otherwise defined, all terms used herein, including technical or scientific terms, have the same meanings as those generally understood by those with ordinary knowledge in the field of art to which the present invention belongs. Such terms as those defined in a generally used dictionary are to be interpreted to have meanings equal to the contextual meanings in the relevant field of art, and are not to be interpreted to have ideal or excessively formal meanings unless clearly defined in the present application.

Embodiments of the present invention will be described below in detail with reference to the accompanying drawings, where those components are rendered the same reference number that are the same or correspond to, regardless of the figure number, and redundant explanations are omitted.

Figure 1:
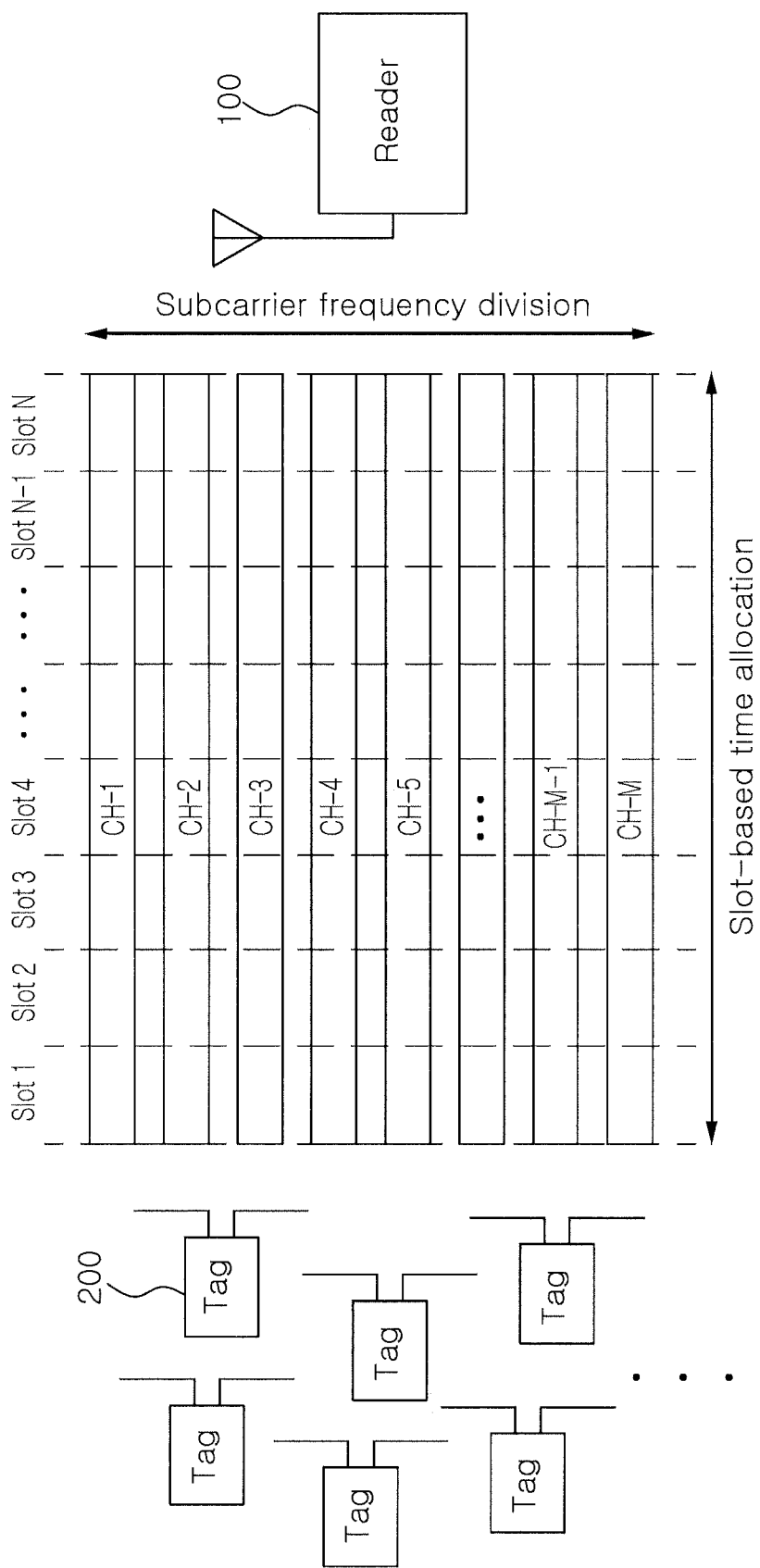
FIG. 1 illustrates an RFID (Radio Frequency Identification) system employing a slot-based multi-subchannel access scheme according to an exemplary embodiment of the present invention.

FIG. 1 illustrates an RFID (Radio Frequency Identification) system employing a slot-based multi-subchannel access scheme according to an exemplary embodiment of the present invention.

With reference to FIG. 1, the RFID system according to an exemplary embodiment of the present invention includes a reader 100 and a plurality of tags 200, and a plurality of slots Slot 1 to Slot N and a plurality of subchannels CH-1 to CH-M are allocated between the reader 100 and the plurality of tags 200.

The reader 100 may adaptively change the numbers (N and M) of slots and subchannels according to an RFID environment, and each tag 200 may randomly select one slot and one subchannel from among the N number of slots and the M number of subchannels to transmit a tag signal. Namely, in the present exemplary embodiment, communication paths between the reader 100 and the tags 200 are diversified, thereby reducing collisions and interference between or among tags.

The reader 100 acquires tag signals received through subchannels in a current slot, checks whether or not they have collided or interfered with each other, and allows a tag using a subchannel, which is not involved in a collision or interference (or which has not been collided or interfered with, or which is free from a collision or interference), to be changed into a sleep state when a next slot comes. Namely, a tag successfully recognition-completed after transmitting the tag signal without a collision or interference is allowed to be changed into the sleep state, whereby the generation of a collision or interference due to a signal generated by the recognition-completed tag can be prevented.

Figure 2:
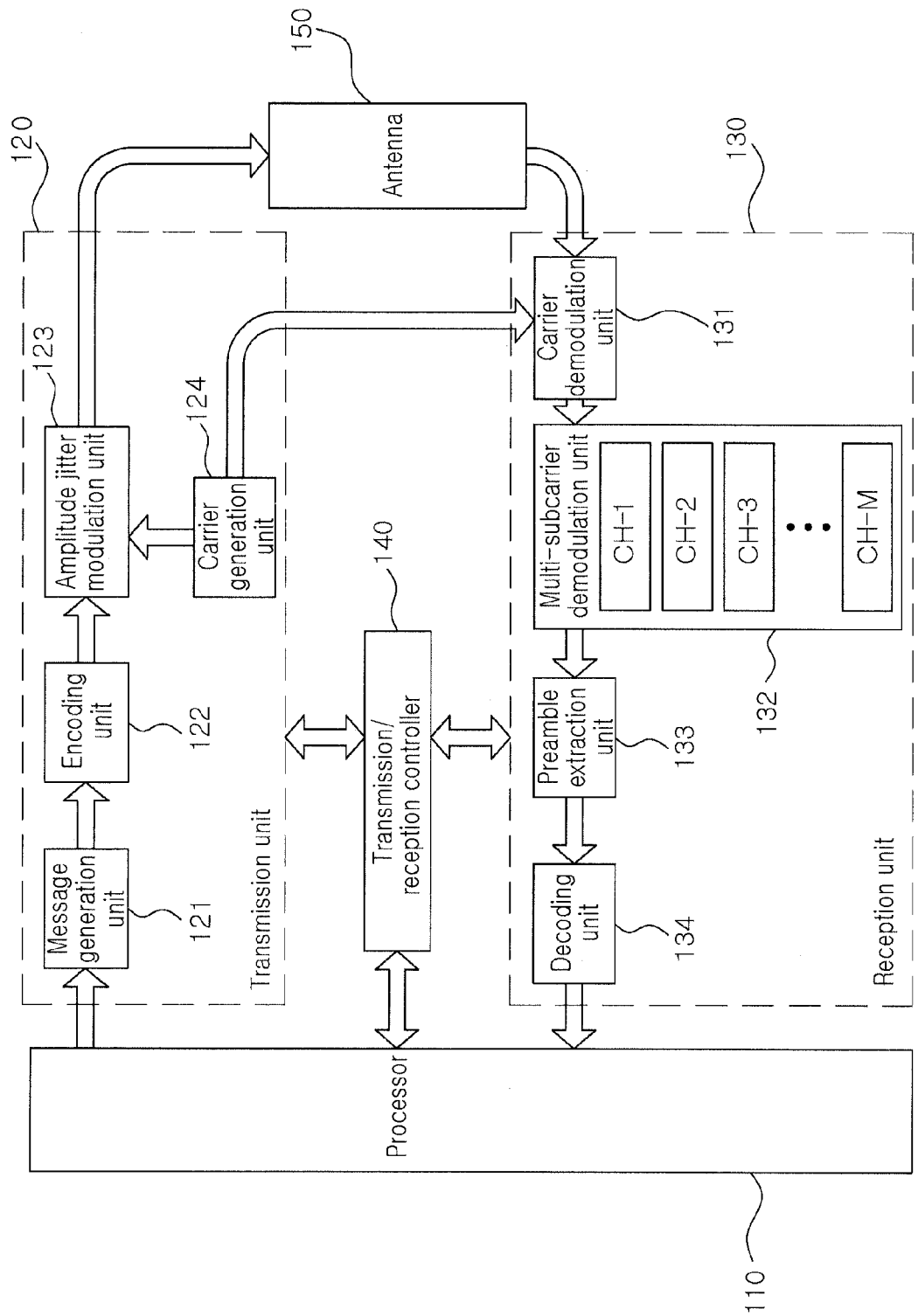
FIG. 2 is a schematic block diagram showing a reader of a passive RFID system employing the slot-based multi-subchannel access scheme according to an exemplary embodiment of the present invention.

FIG. 2 is a schematic block diagram showing a reader of a passive RFID system employing the slot-based multi-subchannel access scheme according to an exemplary embodiment of the present invention.

With reference to FIG. 2, the reader 100 includes a processor 110 dividing slots and subchannels to configure a round, recognizing subchannels that are not involved in a collision and interference by the slots, and changing the subchannels that are not involved in a collision and interference, into a sleep state, a transmission unit 120 encoding a command generated through the processor 110, performing an amplitude jitter modulation on the encoded command, and transmitting the modulated command, a reception unit acquiring and demodulating tag signals received through a plurality of subchannels by the slots, and providing the demodulated tag signals to the processor, so that the processor 110 can recognize the subchannels that are not involved in a collision and interference, a transmission/reception controller 140 controlling the operations of the transmission unit 120 and the reception unit 130 under the control of the processor 110, and an antenna 150 transmitting a signal generated by the transmission unit 120 to the tags 200 or receiving signals transmitted by the tags 200.

In this case, the processor 110 may generate a query command for informing about the number of the slots and subchannels constituting the current round, a slot command for requesting the providing of a tag signal from a tag using the current slot, a sleep command for enabling a subchannel that is not involved in a collision and interference to be changed into a sleep state, and the like, and in particular, the processor 110 simultaneously generates and transmits the slot command and the sleep command.

The transmission unit 120 includes a message generation unit 121 receiving a command from the processor 110 and generating a message for transmitting the received command to the tags 200, an encoding unit 122 encoding the message which has been generated by the message generation unit 121, a carrier generation unit 124 generating a carrier signal, an amplitude jitter modulation unit 123 receiving the encoded signal, the carrier signal, and the like, from the encoding unit 122 and the carrier generation unit 124, respectively, and performing amplitude jitter modulation on the received signals, and the like.

Figure 3A:
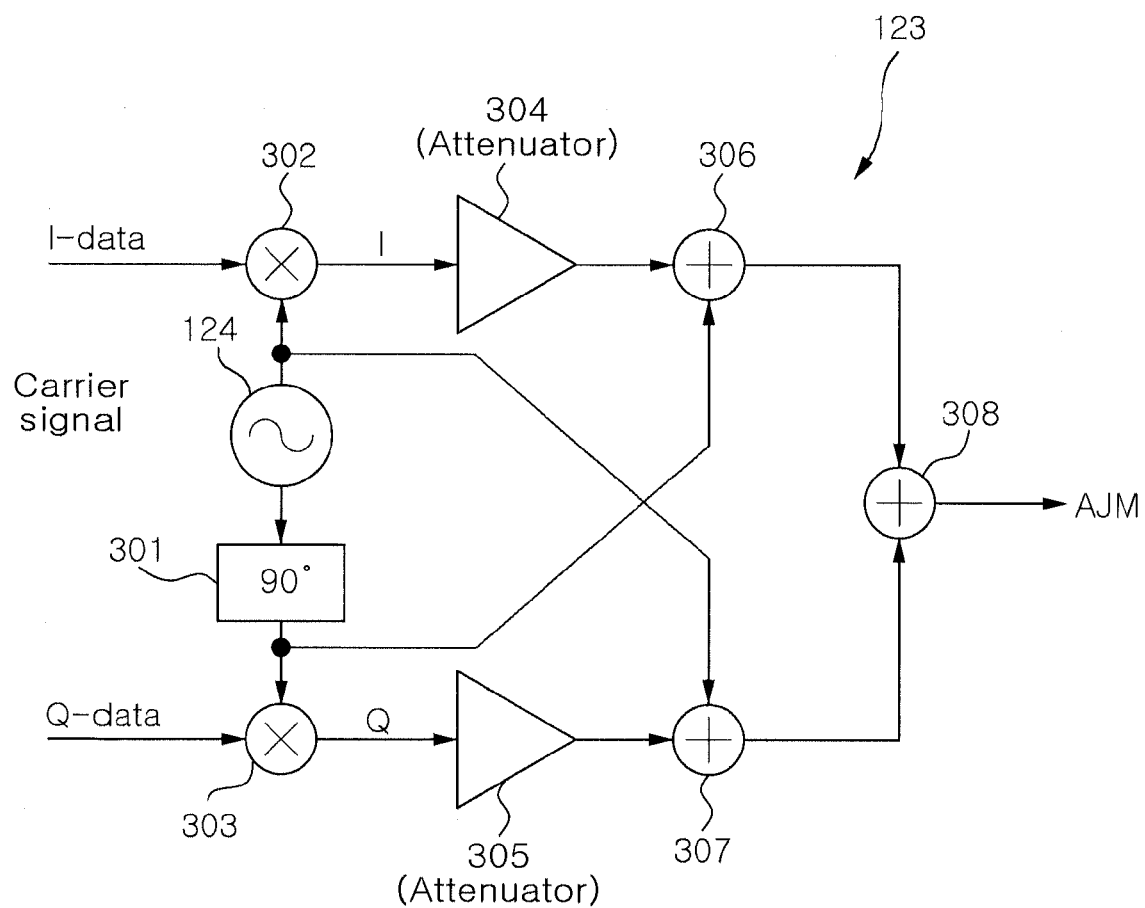
FIG. 3a is a circuit diagram of an amplitude jitter modulation unit included in the reader of the passive RFID system employing the slot-based multi-subchannel access scheme according to an exemplary embodiment of the present invention.

The amplitude jitter modulation unit 123, configured as illustrated in FIG. 3a, may modulate various commands and output the same, and in particular, the amplitude jitter modulation unit 123 may receive commands, such as a slot command or a sleep command, as I and Q channel signals (I and Q), simultaneously modulates them, and output the modulated signals.

Figure 3B:
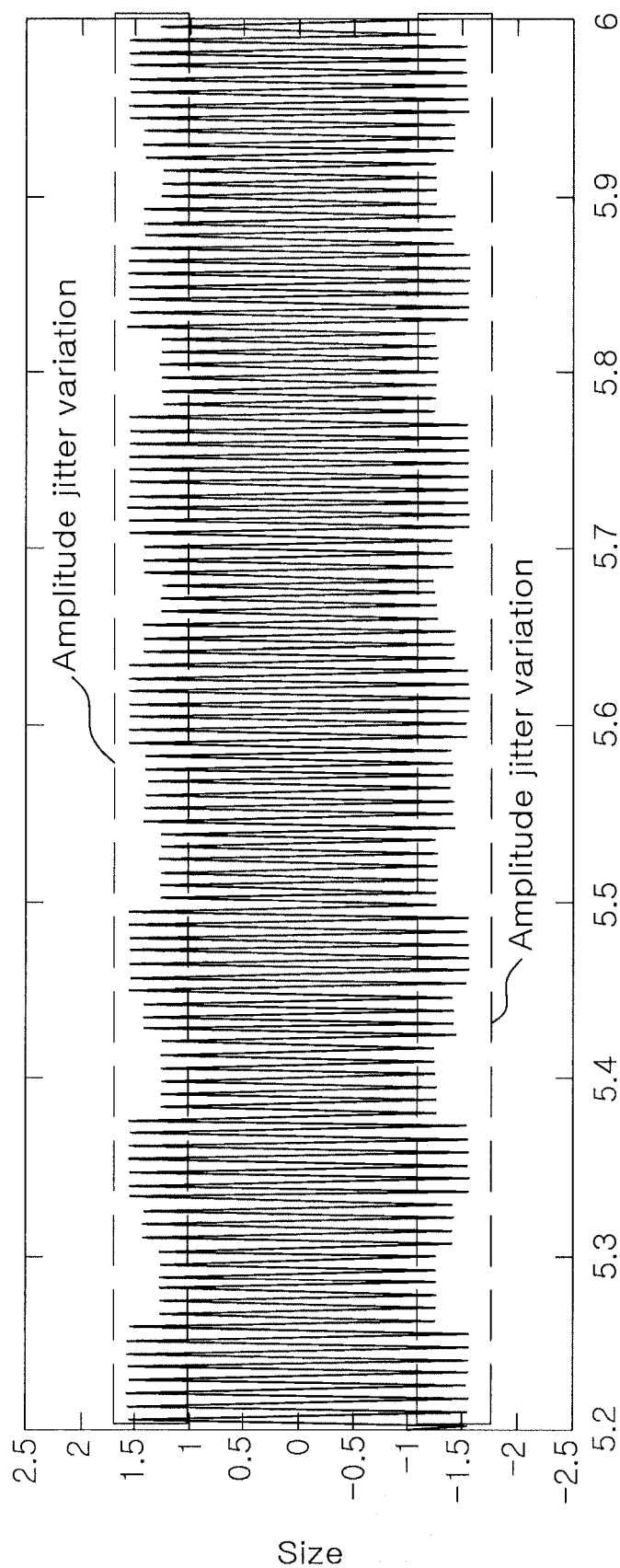
FIG. 3b is a graph showing an amplitude jitter modulation signal according to an exemplary embodiment of the present invention.

In detail, the amplitude jitter modulation unit 123 includes a phase delay 301 delaying a carrier signal by 90 degrees and outputting the same, first and second transmission mixers 302 and 303 mixing the I channel signal (I-data) in the carrier signal and the Q channel signal (Q-data) in an output signal from the phase delay 301, first and second attenuators 304 and 305 attenuating the amplitude of the output signals from the first and second transmission mixers 302 and 303, first and second adders 306 and 307 adding the output signal from the phase delay 30 to an output signal from the first attenuator and the carrier signal to an output signal from the second attenuator 305, and a third adder 308 generating an amplitude jitter modulation signal (AJM) in addition to the output signals from the first and second adders 306 and 307. Resultantly, the amplitude jitter modulation unit 123 generates the amplitude jitter modulation signal (AJM) having an amplitude sloping within a certain interval as shown in FIG. 3b.

In this case, the first and second attenuators 304 and 305 may adjust the amplitude of a pulse modulation signal having good bandwidth characteristics such as a Miller code modulation with respect to a carrier signal of each channel such that an influence of a reader modulation signal frequency spectrum component on a tag signal band received through a different subchannel can be minimized.

The amplitude jitter modulation unit 123 may be embodied to have various circuit structures by using several substantial analog elements, electronic elements, or the like, based on the configuration illustrated in FIG. 3a.

The reception unit 130 includes a carrier demodulation unit 131 removing a radiowave carrier signal included in a signal received from the antenna 150, a multi-subcarrier demodulation unit 132 receiving the signal which has been demodulated by the carrier demodulation unit 131 and extracting tag signals by subchannels, a preamble extraction unit 133 extracting a preamble of a valid tag signal from the output signal of the multi-subcarrier demodulation unit 132, and a decoding unit 134 decoding an output signal from the preamble extraction unit 133 to extract tag data and status information, and transferring the extracted tag data and status information to the processor 110, and the like. In this case, the carrier demodulation unit 131 may use various structures such as an envelope detector, a quadrature detector, a synchronization detector, and the like, depending on the complexity of the reader 100.

Figure 4:
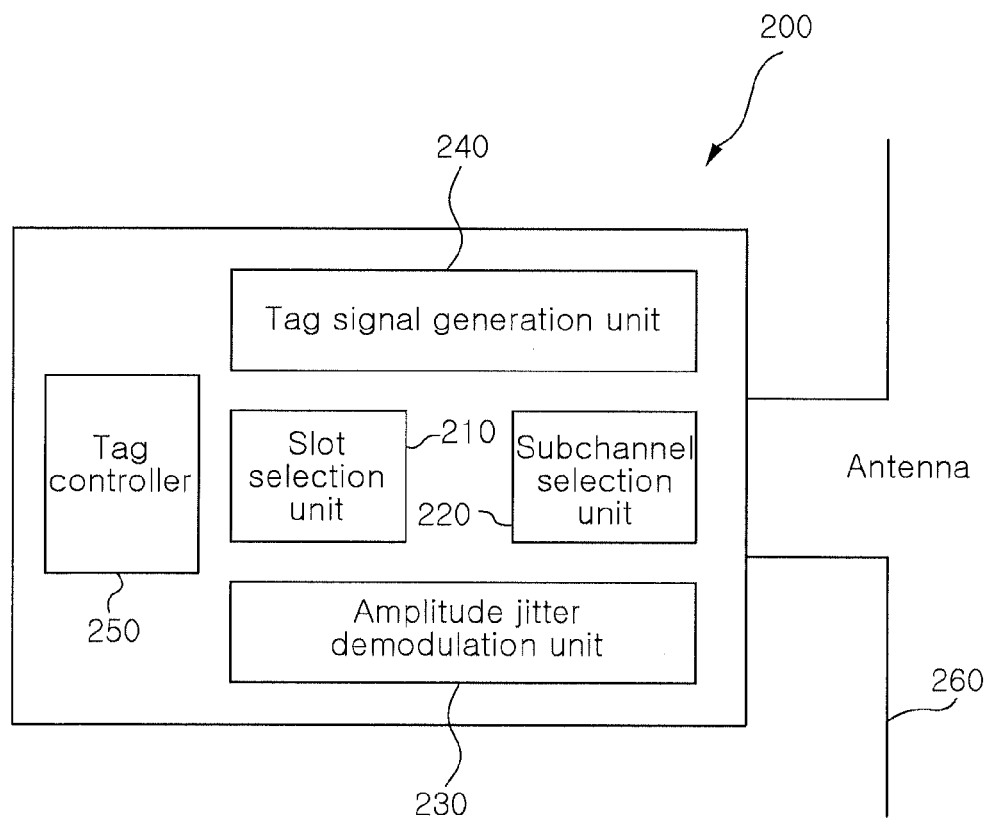
FIG. 4 is a schematic block diagram of a tag in the passive RFID system employing the slot-based multi-subchannel access scheme according to an exemplary embodiment of the present invention.

FIG. 4 is a schematic block diagram of a tag in the passive RFID system employing the slot-based multi-subchannel access scheme according to an exemplary embodiment of the present invention.

As shown in FIG. 4, the tag 200 includes a slot selection unit 210 randomly selecting a slot to be used for communicating with the reader 100, a subchannel selection unit 220 for randomly selecting a subchannel to be used for communicating with the reader 100, an amplitude jitter demodulation unit 230 performing amplitude jitter demodulation on a signal transmitted from the reader 100, a tag controller 250 recognizing the number of slots and subchannels constituting of a current round and selecting a single slot and a single subchannel through the slot selection unit 210 and the subchannel selection unit 220 if the signal which has been demodulated by the amplitude jitter demodulation unit 230 is a query command, transmitting a tag signal to the reader 100 if the signal demodulated by the amplitude jitter demodulation unit 230 is a slot command, and determining whether to change a corresponding tag into a sleep state if the signal demodulated by the amplitude jitter demodulation unit 230 is a sleep command, a tag signal generation unit 240 generating a tag signal to be transmitted through the subchannel selected by the subchannel selection unit 220 under the control of the tag controller 250, and an antenna 260 transmitting the signal which has been generated by the tag signal generation unit 240 to the reader 100 or receiving a signal which has been transmitted by the reader 100.

Figure 5A:
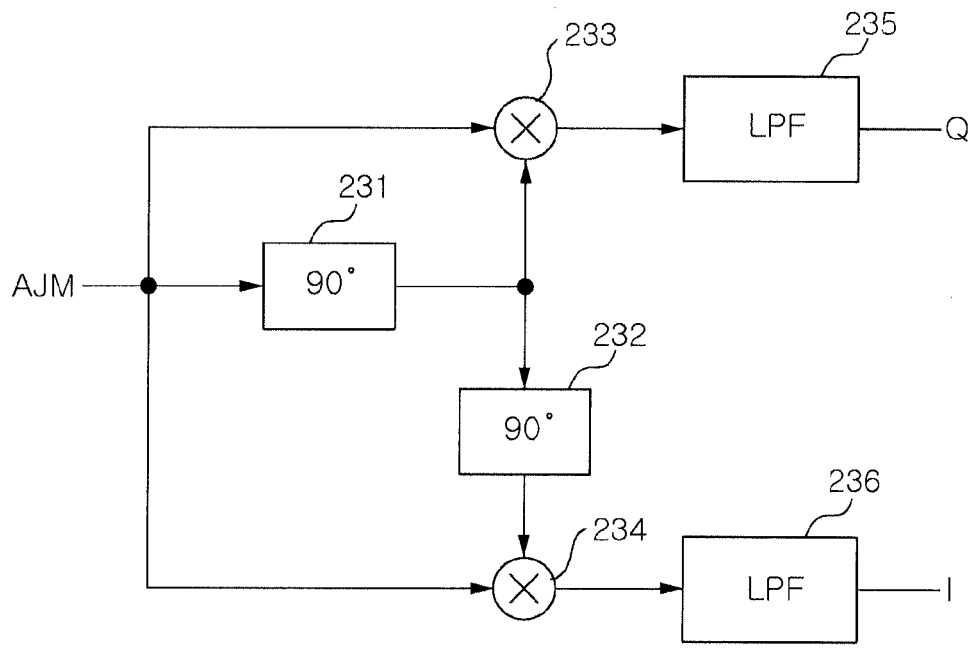
FIG. 5a is a circuit diagram of an amplitude jitter demodulation unit included in the tag of the passive RFID system employing the slot-based multi-subchannel access scheme according to an exemplary embodiment of the present invention.
Figure 5B:
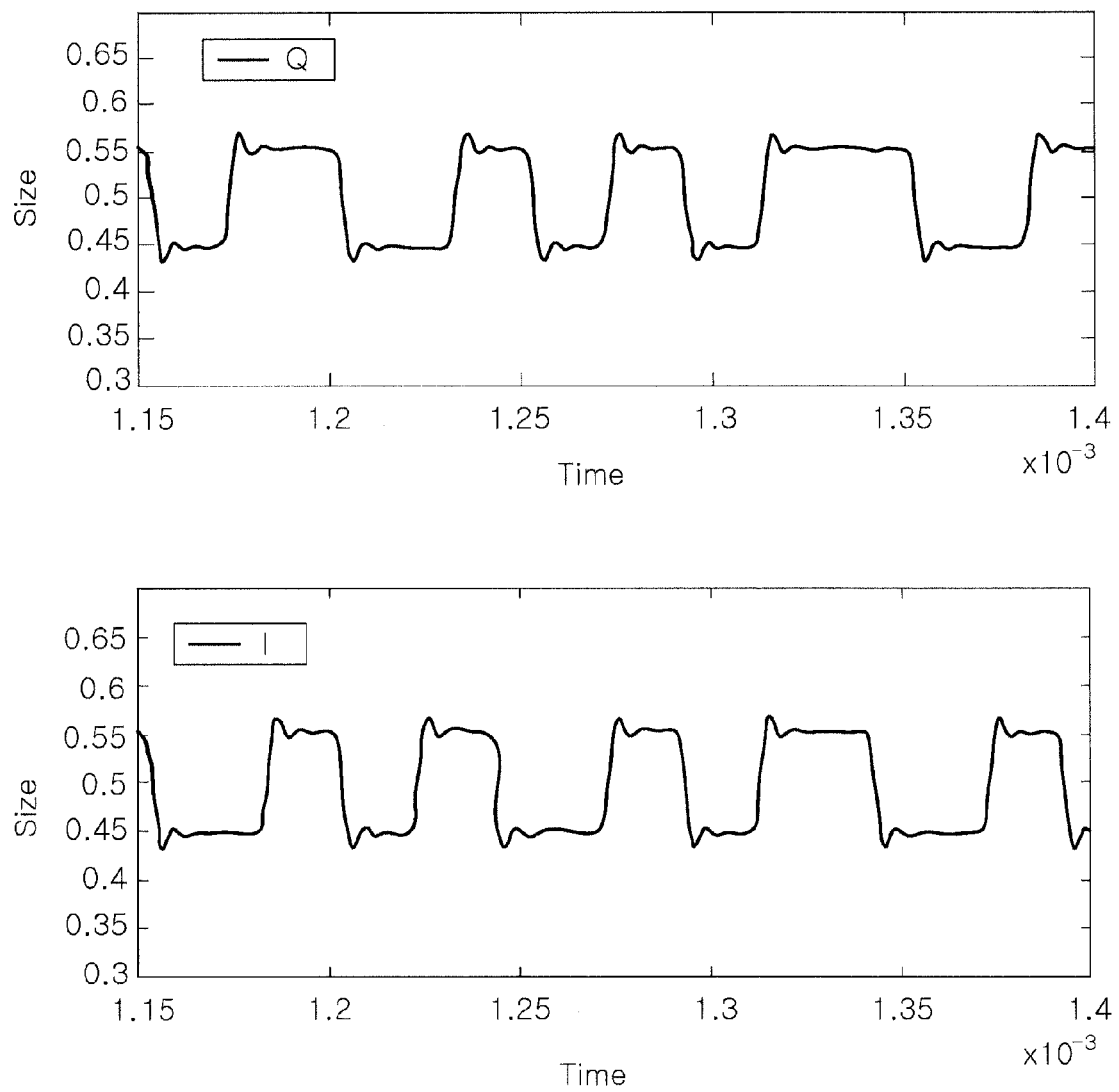
FIG. 5b is graphs showing I and Q channel signals which have been amplitude jitter demodulated according to an exemplary embodiment of the present invention.

The amplitude jitter demodulation unit 230 is configured as shown in FIG. 5a to simultaneously extract I and Q channel signals (I and Q). In detail, the amplitude jitter demodulation unit 230 includes first and second phase delays 231 and 232 phase-delaying the amplitude jitter modulation signal AJM by 90 degrees and 180 degrees, first and second reception mixers 233 and 234 mixing output signals from the first and second phase delays 231 and 232 and the amplitude jitter modulation signal AJM, and low pass filters (LPFs) 235 and 236 low-pass-filtering output signals from the first and second reception mixers 233 and 234 to extract I and Q channel signals (I and Q). Resultantly, the amplitude jitter demodulation unit 230 simultaneously extracts the I and Q channel signals (I and Q) expressed as shown in FIG. 5b from the amplitude jitter modulation signal AJM.

Thus, according to an exemplary embodiment of the present invention, although the reader 100 simultaneously transmits a slot command and a sleep command as described above, the tag 200 can recognize and extract them.

Figure 6:
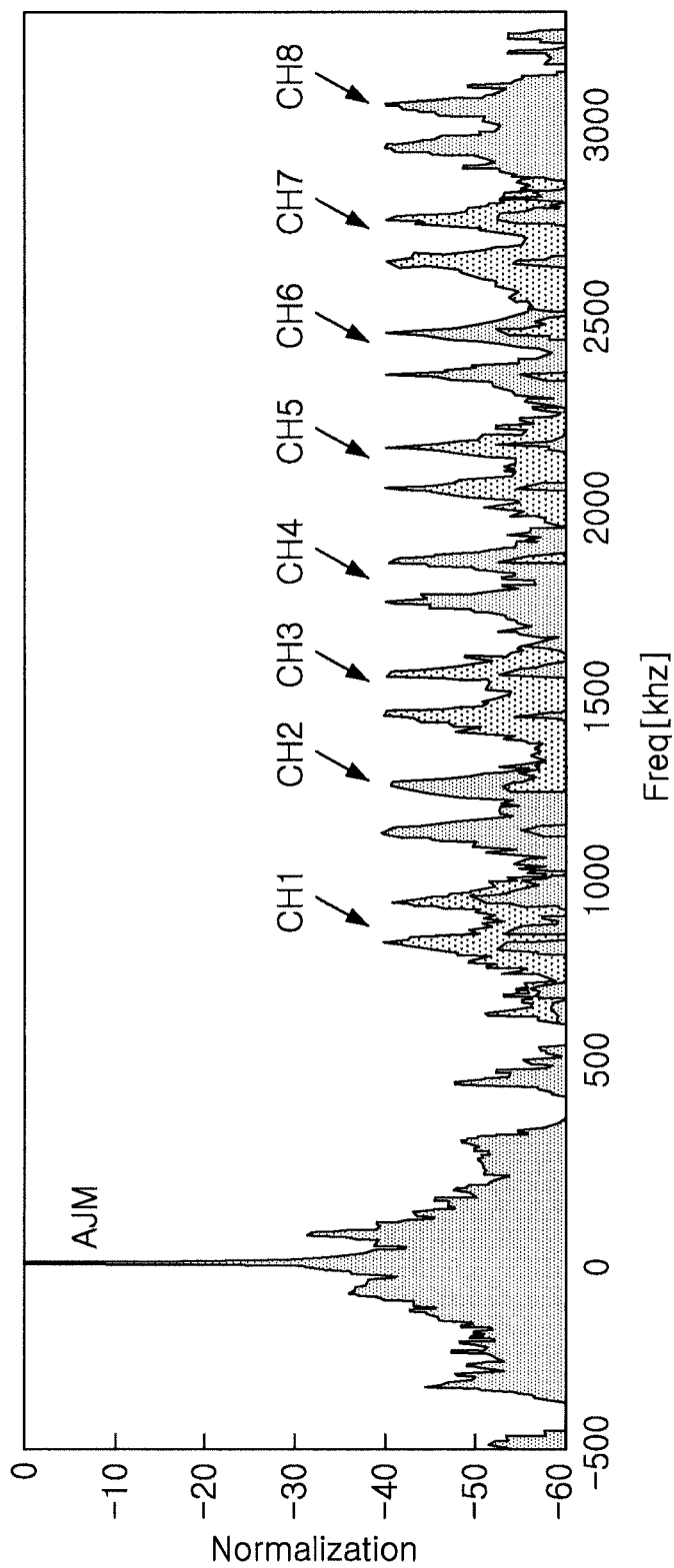
FIG. 6 is a graph showing examples of frequency spectrums generated between a reader and a plurality of tags according to an exemplary embodiment of the present invention.

FIG. 6 is a graph showing examples of frequency spectrums generated between a reader and a plurality of tags according to an exemplary embodiment of the present invention, including a spectrum of the amplitude jitter modulation signal AJM of the reader 100 and a spectrum obtained when the plurality of tags 200 transmit tag signals by using different subchannels.

With reference to FIG. 6, the reader 100 and the plurality of tags 200 perform communication by using different frequency bandwidths, and in particular, it is noted that the plurality of tags 200 transmit tag signals through subchannels each having a different frequency bandwidth.

Therefore, the plurality of tags 200 can transmit tag signals through a plurality of subchannels without a collision or interference therebetween, and the reader 100 can simultaneously acquire the tag signals transmitted from the tags 200 through the plurality of subchannels. As a result, the reader 100 can quickly and accurately recognize the great deal of tags 200.

Figure 7:
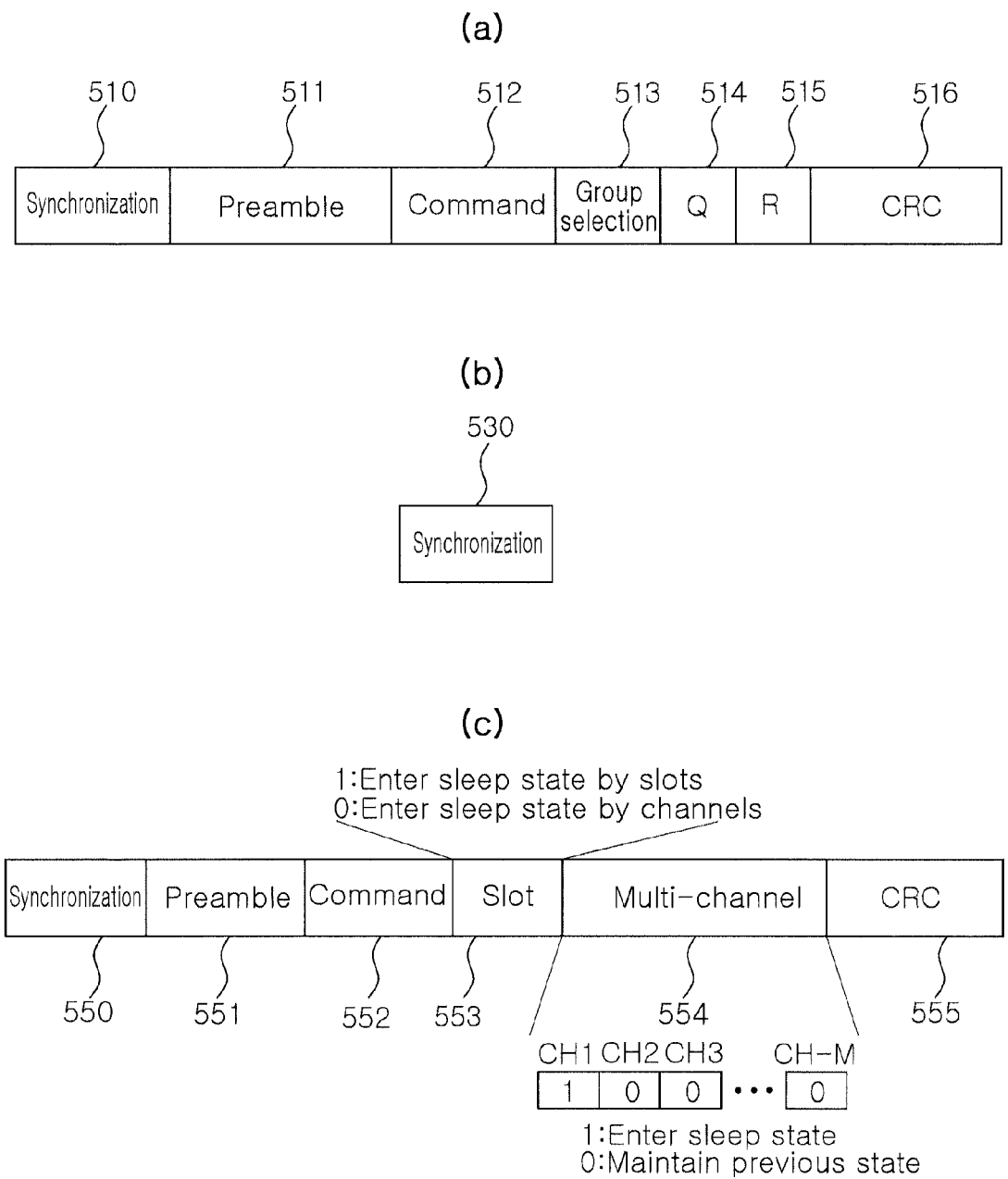
FIG. 7 illustrates commands used in the passive RFID system according to an exemplary embodiment of the present invention.

FIG. 7 illustrates commands used in the passive RFID system according to an exemplary embodiment of the present invention. In FIG. 7, (a) shows the structure of a query command, (b) shows the structure of a slot command, and (c) shows the structure of a sleep command.

First, as shown in FIG. 7(a), the query command may include a synchronization field 510 in which a synchronized string is stored, a preamble field 511 in which preamble information is stored, a command field 512 in which information indicating that a corresponding command is the query command is stored, a group selection field 513 in which information regarding whether all the tags are to participate in a current round or only tags not in a sleep state are to participate in the current round is stored, a Q field 514 in which information regarding the number of slots is stored, an R field 515 in which information regarding the number of subchannels is stored, and a CRC field 516 in which CRC information is stored.

For example, the reader 100 may set 1 in the group selection field 513 to allow all the tags to participate in the current round or may set 0 in the group selection field 513 to allow only tags not in a sleep state to participate in the current round. Also, the reader 100 may store Q and R counter values in the Q field 514 and the R field 515 in order to inform that the current round includes $2^{Q-1}$ number of slots and $2^{R-1}$ number of subchannels. Each tag 200 can determine whether to participate in the current round by interpreting the group selection field 513 and recognize the slots and subchannels constituting the current round by interpreting the Q field 514 and the R field 515.

As shown in FIG. 7(b), the slot command may include only a synchronization field 530. For a single round, a total of $2^{Q-1}$ number of slot commands (C-Slot) are generated and transmitted.

Finally, as shown in FIG. 7(c), the sleep command includes a synchronization field 550 in which a synchronized string is stored, a preamble field 551 in which preamble information is stored, a command field 552 in which information indicating that a corresponding command is the sleep command is stored, a slot field 553 in which information regarding whether or not changing into a sleep state is made by the slots or by the channels is stored, a multi-channel field 554 in which information regarding subchannels to be changed into the sleep state when changing to the sleep state is to be made by the channels is stored, and a CRC field 555 in which CRC information is stored. The multi-channel field 554 may include a plurality of areas divided according to the number of subchannels constituting the current round, and the size of the plurality of areas may vary depending on the number of the subchannels.

For example, in a case in which several tags, responded to previous slots, have transmitted their tag signals by selecting different subchannels, without causing a collision and interference, the reader 100 may set 1 in the slot field 553 in order to enable all the tags responded to the previous slots to be changed into the sleep state. Meanwhile, when two or more tags, responded to the previous slots, have selected the same subchannels to cause a collision and interference, the reader 100 may set 0 in the slot field 553 and 1 in only areas, corresponding to the subchannels through which the tag signals were transmitted without a collision and interference, of the multi-channel field 554. Then, at the tag side, when 1 is set in the slot field 553, tags are immediately changed into the sleep state without interpreting the multi-channel field 554, and when 0 is set in the slot field 553, the tags determine whether to change into the sleep state by interpreting the multi-channel field 554.

Figure 8:
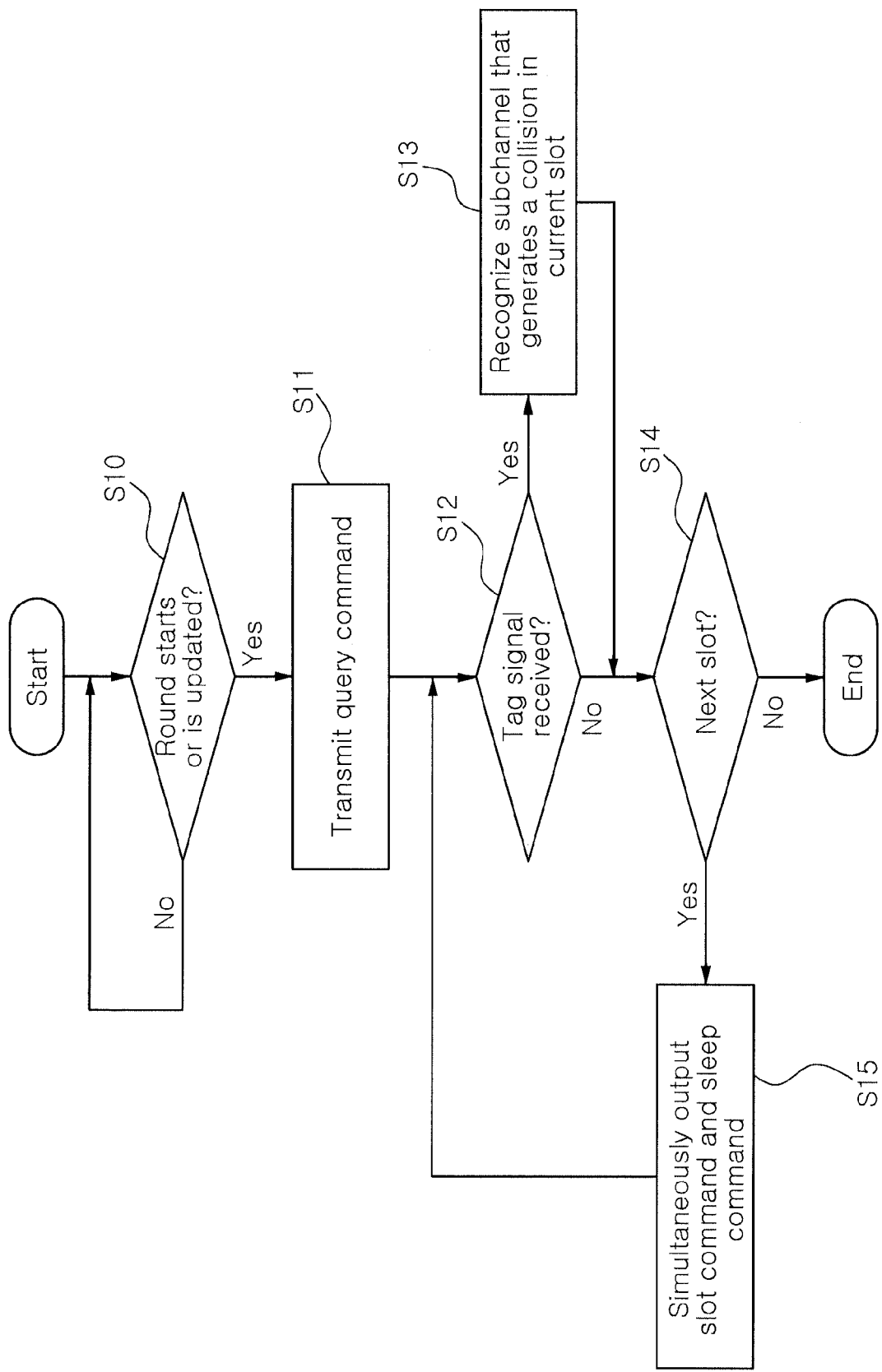
FIG. 8 is a flow chart illustrating the process of an operation method of a reader of the passive RFID system according to an exemplary embodiment of the present invention.

FIG. 8 is a flow chart illustrating the process of an operation method of a reader of the passive RFID system according to an exemplary embodiment of the present invention.

First, when a round starts or is updated (S10), the reader 100 sets a tag group for participating in the current round and the number of slots and subchannels constituting the current round, and then, informs the plurality of tags 200 accordingly through the query command (S11).

When tag signals are received which have been transmitted in response to the query command or the slot command (S12), the reader 100 analyzes the received tag signals to recognize subchannels involved in a collision and interference in the current slots (S13).

When next slots come (S14), the reader 100 simultaneously transmits the slot command and the sleep command in order to request tag signals from the tags which have selected the corresponding slots and, at the same time, operates tags, which have used subchannels not involved in a collision or interference in the previous slots, in a sleep state, by reflecting the operation results of step S13.

Steps S12 to S15 are repeatedly performed on every slot. Accordingly, the tags using the subchannels not involved in a collision and interference can be operated in the sleep state and only otherwise tags may continuously communicate with the reader 100.

As a result, the tags, which have successfully transmitted data in the current round, do not participate in a round any longer, whereby a generation of an unnecessary collision and interference between or among tags can be minimized, and accordingly, the reader 100 can quickly and stably recognize the great deal of tag signals.

Figure 9:
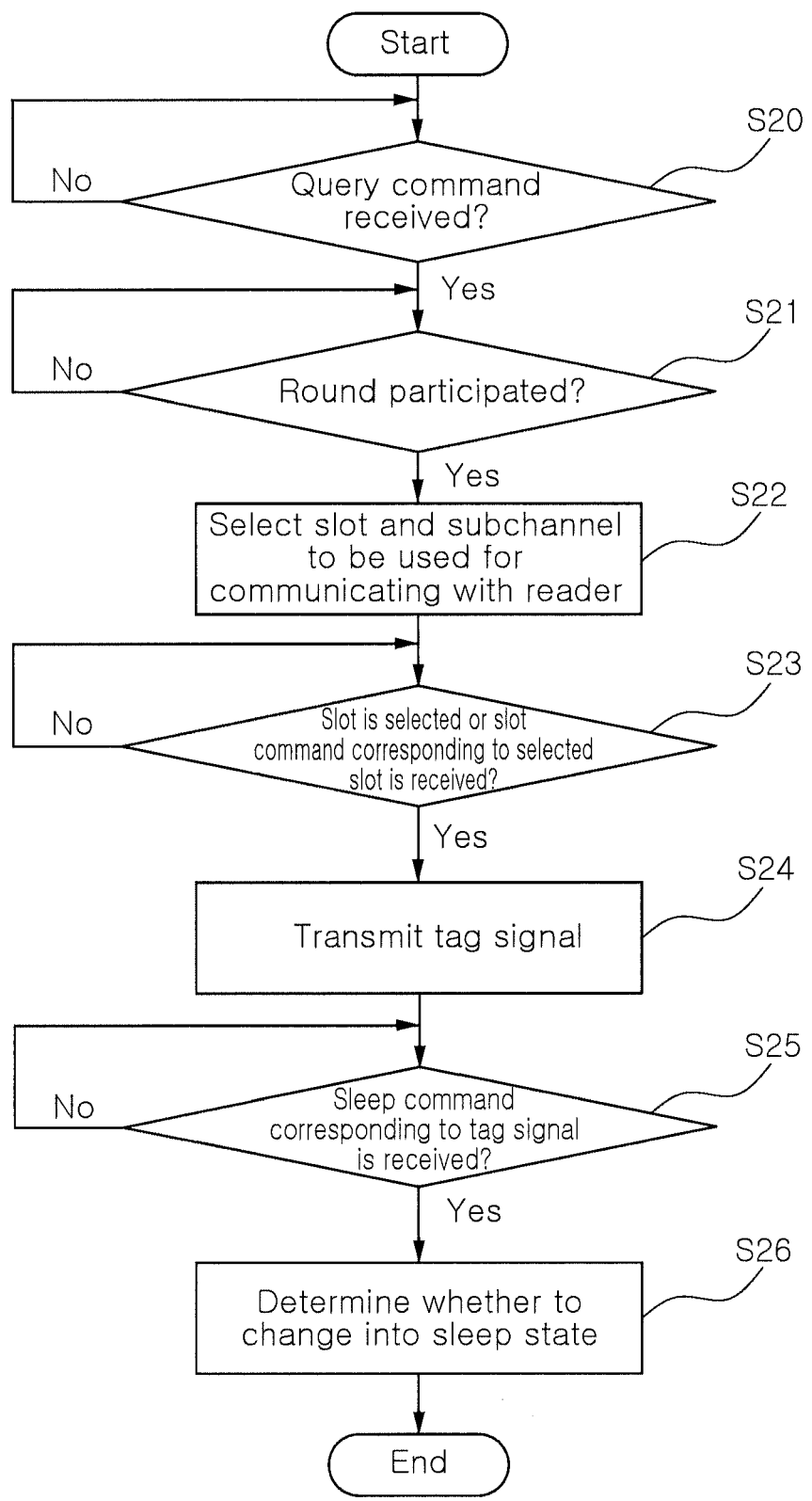
FIG. 9 is a flow chart illustrating the process of an operation method of a reader of the passive RFID system according to an exemplary embodiment of the present invention.

FIG. 9 is a flow chart illustrating the process of an operation method of a reader of the passive RFID system according to an exemplary embodiment of the present invention.

When the tag 200 receives the query command (S20), it recognizes that a round newly starts or is updated and determines whether to participate in the current round by interpreting the group selection field 513 of the query command (S21).

When the tag 200 determines to participate in the current round, it recognizes the number of the slots and subchannels constituting the current round by interpreting the Q and R fields 514 and 515 of the query command, and then, randomly selects one slot and one subchannel to be used (namely, to be used by the tag 200) for communicating with the reader 100 (S22).

When the slot selected in step S22 is slot 0 (S23), the tag 200 transmits a tag signal to the selected subchannel selected in step S22 in response to the query command (S24). Meanwhile, when the slot selected in step S22 is not the slot 0, the tag 200 waits until such time as a slot command corresponding to the slot selected in step S22, and then, when the corresponding slot command is received (S23), the tag 200 transmits a tag signal in response (S24).

When a sleep command corresponding to the tag signal transmitted in step S24 is received (S25), the tag 200 determines whether to change into the sleep state by interpreting the received sleep command (S26).

In step S26, the tag 200 first interprets the slot field 553 of the sleep command. When changing into the sleep state by the slots is determined according to the interpretation results, the tag 200 is unconditionally changed into the sleep state without interpreting the multi-channel field 554, whereas when changing into the sleep state by the channels, the tap 200 additionally interprets the multi-channel field 554 to recognize subchannels to be changed into the sleep state, and then changes into the sleep state.

Figure 10:
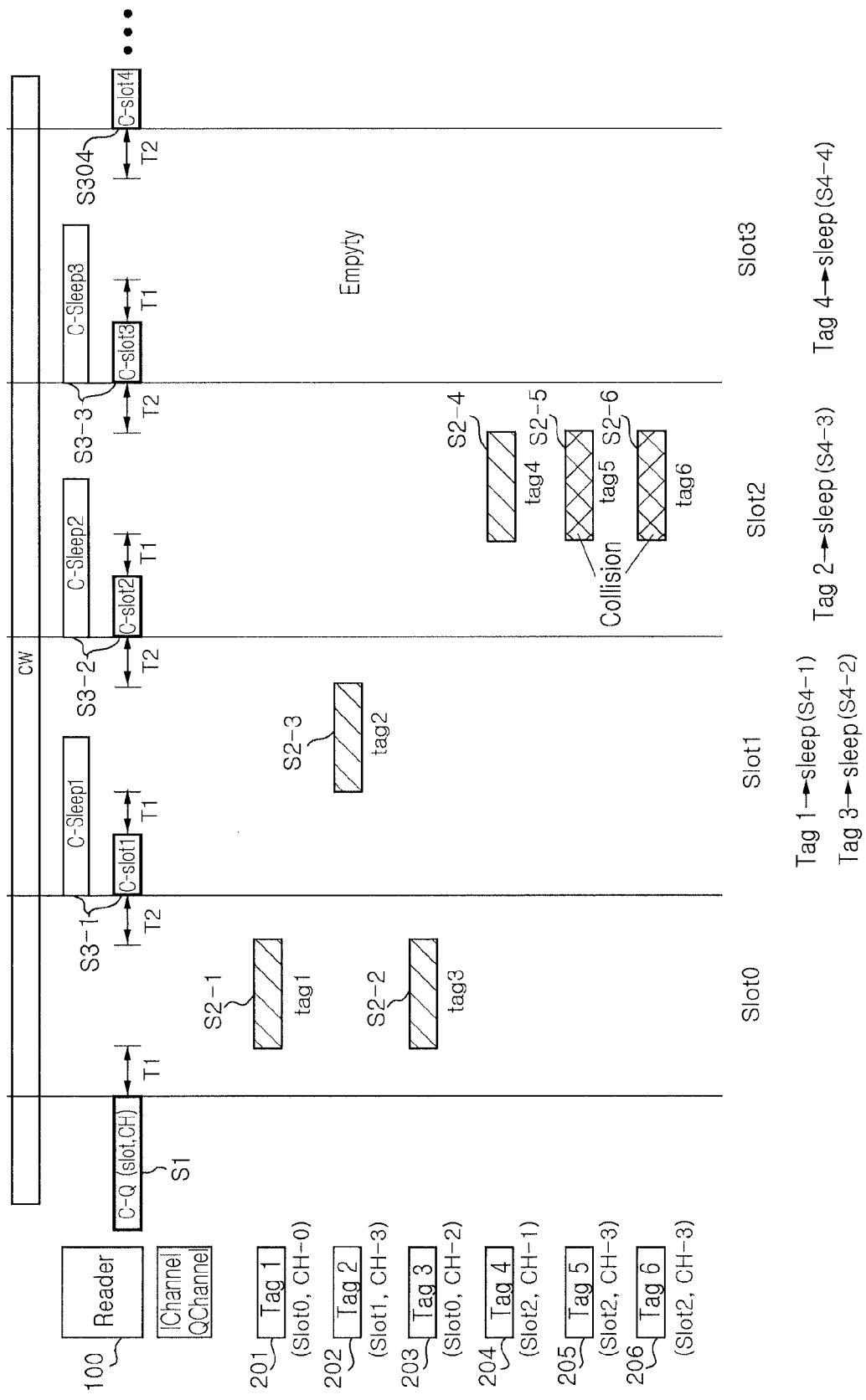
FIG. 10 illustrates an example of an operation method of the passive RFID system according to an exemplary embodiment of the present invention.

The case in which the reader recognizes six tags and controls the communication states of the six tags will now be described in detail with reference to FIG. 10.

First, the reader 100 configures a current round with a total of eight slots and four channels, enables the six tags to participate in the current round, and then transmits a query command (C-Q) including corresponding information.

Then, the six tags 201 to 206 participate in the current round in response to the query command (C-Q) and randomly select slots and subchannels to be used for communicating with the reader 100. In this case, it is assumed that Tag 1 (201) selects slot 0 and subchannel 0 (Slot0 and CH-0), Tag 2 (202) selects a first slot and subchannel 3 (Slot1 and CH-3), Tag 3 (203) selects slot 0 and subchannel 2 (Slot0 and CH-2), Tag 4 (204) selects a second slot and subchannel 1 (Slot2 and CH-1), Tag 5 (205) selects the second slot and subchannel 3 (Slot2 and CH-3), and Tag 6 (206) selects the second slot and subchannel 3 (Slot2 and CH-3).

Subsequently, the Tags 1 and 3 (201 and 203), which have selected the slot 0 (Slot0), transmit tag signals tag1 and tag3 through the subchannels 0 and 2 (CH-0 and CH-2) after a predetermined time T1 and then wait until such time as a sleep command C-Sleep1 transmitted in response to the tag signals tag1 and tag3 (S2-1 and S2-2) is received.

Then, the reader 100 acquires the tag signals tag1 and tag3 transmitted before a predefined time T2 and analyzes them to determine whether or not they have collided or interfered with each other. The reader 100 then simultaneously modulates a slot command (C-Slot1) and a sleep command (C-Sleep1) according to an amplitude jitter scheme and transmits the same in the first slot (Slot1). In this case, because Tag 1 (201) and Tag 3 (203) had responded through the different subchannels (CH-0 and CH-2) in the slot 0 (Slot0), the reader 100 sets the slot field 553 in the first slot command (C-Slot1) as 1 (S3-1).

Subsequently, Tag 2 (202), which has selected the first slot (Slot1), receives the first slot command (C-Slot1) and then transmits the tag signal tag2 to the reader 100 after a time T1 (S2-3). At the same time, Tag1 and Tag3 (201 and 203), which had responded to the immediately previous slot 0 (Slot0), interpret a signal of the sleep command (C-Sleep1) of an I channel, which has been demodulated according to the amplitude jitter scheme, to find that the slot field 513 has been set to be 1, so they are both changed into the sleep state (S4-1 and S4-2).

The reader 100 then acquires a tag signal tag2 of Tag 2 (202) and analyzes it to find that there is no subchannel involved in a collision and interference, and when the second slot (Slot2) comes, the reader 100 simultaneously modulates a second slot command (C-Slot2) and a second sleep command (C-Sleep2) according to the amplitude jitter scheme and transmits the same (S2-2). In this case, because the only one tag (i.e., Tag 2) has response in the immediately previous first slot (Slot1), the reader 100 sets the slot field 553 of the sleep command (C-Sleep2) as 1.

Thereafter, Tag 4, Tag 5, and Tag 6, which have selected the second slot (Slot2), all receive the second slot command (C-Slot2), and then, transmit their tag signals tag4, tag5, and tag6 to the reader 100 after a time T1 (S2-4, S205, S2-6) and, at the same time, the Tag 2 (202), which had responded to the immediately previous first slot (Slot1), interprets the slot field 553 of the second sleep command (C-Sleep2) and is changed into a sleep state (S4-3).

Meanwhile, because Tag 5 and Tag 6 have transmitted the tag signals tag5 and tag6 through one subchannel 3 (CH-3) in the second slot (Slot2), the signals collide and interfere with each other, resulting in that the reader 100 cannot successfully acquire the two tag signals tag5 and tag6.

Then, the reader 100 generates a third sleep command (C-Sleep3) in which the slot field 553 of the third slot (Slot3) is set to be 0 and only a value of the subchannel 1 selected by Tag 4 (204) in the multi-channel field 554 is set to be 1, and transmits the same.

As a result, Tag 4 (204) is changed into a sleep state in response to the information stored in the slot field 553 and the multi-channel field 554 of the third sleep command (C-Sleep3) transmitted in the next slot interval, whereas T5 and T6 (205 and 206) participate in a next round to continuously communicate with the reader 100.

In this manner, the reader 100 can check tag responses over up to the set number of slots and terminate the current round, and then, performs a new query command (C-Q) to repeatedly perform new rounds to thereby acquire all the tag signals. Also, the reader 100 may set the group selection field value in the query command (C-Q) as 1 to activate all the tags in the sleep state to allow the tags to participate in a new round, to thereby resuming communication with the tags.

Figure 11:
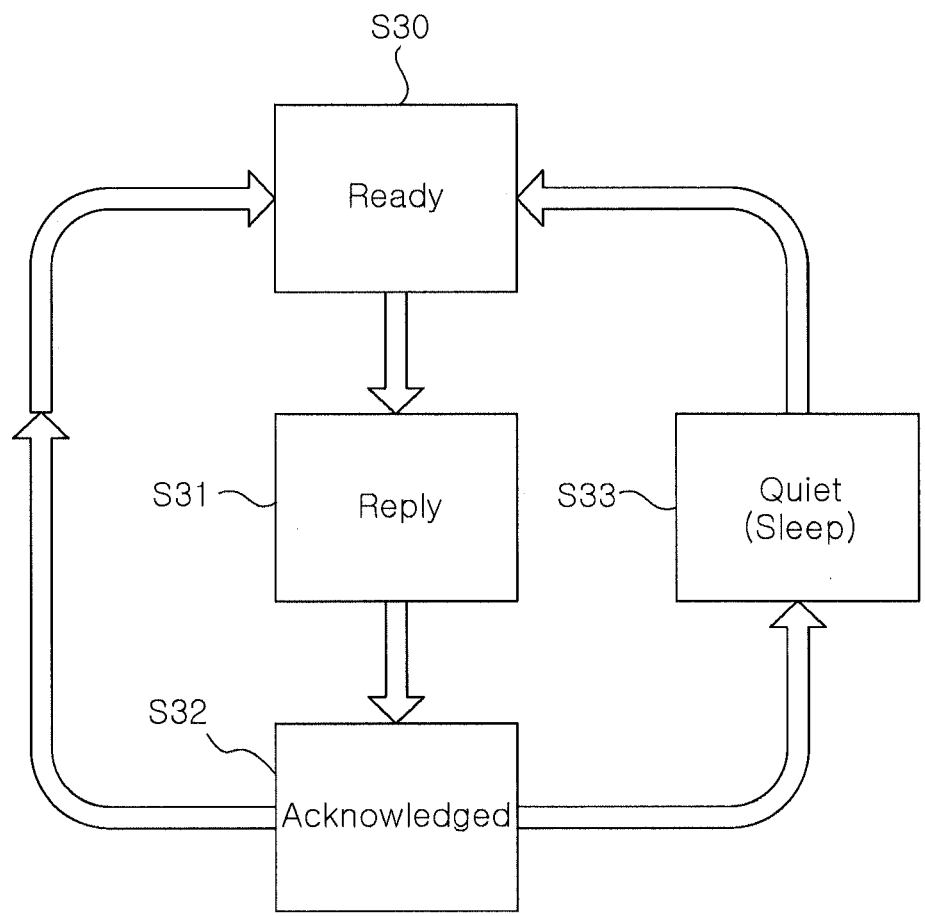
FIG. 11 is a view schematically showing changes in the state of a tag according to an exemplary embodiment of the present invention.

FIG. 11 is a view schematically showing changes in the state of a tag according to an exemplary embodiment of the present invention.

With reference to FIG. 11, states of the tag 200 may include four states: A Ready state (S30), a Reply state (S31), an Acknowledged state (S32), and a Quiet state (S33).

When the tag receives energy from the reader 100, namely, when the tag 200 in the Ready state (S30) receives the query command (C-Q), slot command (C-Slot) or the like, the tag 20 is changed into the Reply state (S31) to inversely scatter a tag signal to the reader.

Then, after the tag 200 completely transits all of its information within a corresponding slot, it is changed into the Acknowledged state (S32). If the tag 200 receives the sleep command (C-Sleep) in the next slot interval and finds that the slot field value 253 with respect to a slot or a subchannel the tag 200 has selected is set as 1, the tag 200 is changed into the Ready state (S30) and waits for a next round command. While the tag 200 is in the Quiet state (S33), when a group selection field value in the query command (C-Q) in a new round is set to be 1, the tag 200 is changed into the Ready state (S30) to participate in the current round to communicate with the reader 100.

Conversely, while the tag 200 is in the Quiet state (S33), if a group selection field value in the query command (C-Q) in a new round is set to be 0, the tag 200 is maintained in the Quiet state (S33).

As set forth above, in the passive RFID system and method according to exemplary embodiments of the invention, because time and frequency domains are simultaneously divided and allocated and a tag transmits a tag signal by using a single slot and frequency band (namely, subchannel), collision and interference between or among tags can be reduced.

Also, a slot command and a sleep command are simultaneously transmitted by the slots, and a tag recognized in a previous slot is changed into a sleep state. Accordingly, inter-tag collision and interference unnecessarily due to a signal of the previously-recognized tag can be additionally prevented, so the operational reliability of the system can be further improved.

While the present invention has been shown and described in connection with the exemplary embodiments, it will be apparent to those skilled in the art that modifications and variations can be made without departing from the spirit and scope of the invention as defined by the appended claims.

What is claimed is:

1. A reader of a passive RFID system, the reader comprising:
   a processor dividing slots and subchannels to configure a round, recognizing subchannels that are not involved in a collision and interference by the slots, and changing a tag of the subchannels that are not involved in a collision and interference, into a sleep state;
   a transmission unit encoding a command generated through the processor, performing an amplitude jitter modulation on the encoded command, and transmitting the modulated command; and
   a reception unit acquiring and demodulating tag signals received through a plurality of subchannels by the slots, and providing the demodulated tag signals to the processor, so that the processor can recognize the subchannels that are not involved in a collision and interference,
   wherein the transmission unit comprises:
   a message generation unit generating a message having a command generated through the processor;
   an encoding unit encoding the message generated by the message generation unit to generate I and Q channel signals; and
   an amplitude jitter modulation unit performing an amplitude jitter modulation on the I and Q channel signals and outputting modulated signals to an antenna,
   wherein the amplitude jitter modulation unit comprises:
   a phase delay phase-delaying a carrier signal by 90 degrees and outputting the same;
   first and second transmission mixers mixing the I channel signal in the carrier signal and the Q channel signal in the output signal from the phase delay;
   first and second attenuators attenuating the amplitude of the output signals of the first and second transmission mixers;
   first and second adders adding an output signal from the phase delay to an output signal from the first attenuator and the carrier signal to an output signal from the second attenuator; and
   a third adder adding the output signals of the first and second adders.

2. The reader of claim 1, wherein the amplitude jitter modulation unit may receive a slot command requesting the providing of a tag signal from a tag that currently uses a slot and a sleep command changing a tag of a subchannel that is not involved in a collision and interference into a sleep state, as the I and Q channel signals, simultaneously modulate them in amplitude, and output the same.

3. The reader of claim 1, wherein the reception unit comprises:
   a carrier demodulation unit removing the carrier signal included in the tag signal;
   a multi-subcarrier demodulation unit extracting a tag signal of each subchannel from an output signal from the carrier modulation unit;
   a preamble extracting unit extracting a preamble of a valid tag signal from an output signal from the multi-subcarrier demodulation unit; and
   a decoding unit decoding an output signal from the preamble extracting unit and transferring the decoded signal to the processor.

4. A tag of a passive RFID system for use with the reader of claim 1, the tag comprising:
   a slot selection unit randomly selecting a slot to be used for communicating with a reader;
   a subchannel selection unit randomly selecting a subchannel to be used for communicating with the reader;
   an amplitude jitter demodulation unit performing an amplitude jitter demodulation on a signal transmitted from the reader;
   a tag controller selecting a single slot or subchannel through the slot selection unit and the subchannel selection unit according to the signal demodulated through the amplitude jitter demodulation unit, and determining whether to transmit a tag signal to the reader or whether to enter a sleep state; and
   a tag signal generation unit transmitting the tag signal to a subchannel selected by the slot selection unit.

5. The tag of claim 4, wherein the amplitude jitter demodulation unit comprises:
   first and second phase delays delaying the phase of the signal transmitted from the reader by 90 degrees and 180 degrees;
   first and second reception mixers mixing output signals from the first and second phase delays and a signal transmitted from the reader; and
   first and second low pass filters (LPFs) filtering output signals from the first and second reception mixers to extract I and Q channel signals.

6. An operation method of the reader of claim 1, the method comprising:
   transmitting a query command when a round starts or is updated to inform a plurality of tags about the number of slots and subchannels constituting the current round;
   simultaneously transmitting a slot request command for a current slot and a sleep command by the slots to request a tag signal and, at the same time, entering a tag using a subchannel that does not cause a collision and interference in a previous slot into a sleep state; and
   acquiring and analyzing a transmitted tag signal in response to a query command or a slot command by the slots to recognize a subchannel that is not involved in a collision and interference in a current slot, and re-entering the control operation.

7. The method of claim 6, wherein the slot command and the sleep command are transmitted in the form of I and Q channel signals which have been amplitude jitter modulated.

8. The method of claim 6, wherein the query command comprises a command field in which information indicating that a corresponding command is the query command is stored, a group selection field in which information regarding a tag group is stored, a Q field in which information regarding the number of slots is stored, and an R field in which information regarding the number of subchannels is stored.

9. The method of claim 6, wherein the sleep command comprises a command field in which information indicating that a corresponding command is the sleep command is stored, a slot field in which information regarding whether all the tags which have responded to previous slots are to enter a sleep state or whether only a tag using a subchannel that is not involved in a collision and interference in a previous slot is to enter a sleep state is stored, and a channel sleep field in which information regarding a subchannel that is not involved in a collision and interference is stored.

10. An operation method of a tag with the reader of claim 1, the method comprising:
- when a query command is received, analyzing the query command to recognize the number of slots and subchannels constituting a current round, and selecting one slot and one subchannel to be used for communicating with a reader; and
- simultaneously receiving a slot request command for a current slot and a sleep command and determining whether to transmit a tag signal to the reader in response to the slot command, or whether to enter a sleep state in response to the sleep command.

11. The method of claim 10, wherein the query command comprises a command field in which information indicating that a corresponding command is the query command is stored, a group selection field in which information regarding a tag group is stored, a Q field in which information regarding the number of slots is stored, and an R field in which information regarding the number of subchannels is stored.

12. The method of claim 11, wherein the selecting of the single slot or subchannel comprises:
- interpreting the group selection field of the sleep command to determine whether to participate in the current round; and
- when it is determined to participate in the current round, interpreting the Q field and the R field to recognize the number of slots and subchannels constituting the current round, and selecting one slot and one subchannel to be used for communicating with the reader.

13. The method of claim 10, wherein the slot command and the sleep command are transmitted in the form of I and Q channel signals which have been amplitude jitter modulated.

14. The method of claim 10, wherein the sleep command comprises a command field in which information indicating that a corresponding command is the sleep command is stored, a slot field in which information regarding whether to enter a sleep state by the slots or by the channels is stored, and a channel sleep field in which information regarding a subchannel that is not involved in a collision and interference is stored.

15. The method of claim 12, wherein the determining as to whether to enter the sleep state comprises:
- interpreting the slot field of the sleep command to recognize whether to enter the sleep state by the slots or by the channels;
- when it is determined to enter the sleep state by the slots, unconditionally entering the sleep state; and
- when it is determined to enter the sleep state by the channels, additionally interpreting the channel sleep field to recognize subchannels of tags to enter the sleep state and determine whether to enter the sleep state.

* * * * *